July 1, 1969 J. L. KANE ETAL 3,452,400
FIBER ALIGNING APPARATUS
Filed Nov. 21, 1966 Sheet 1 of 2
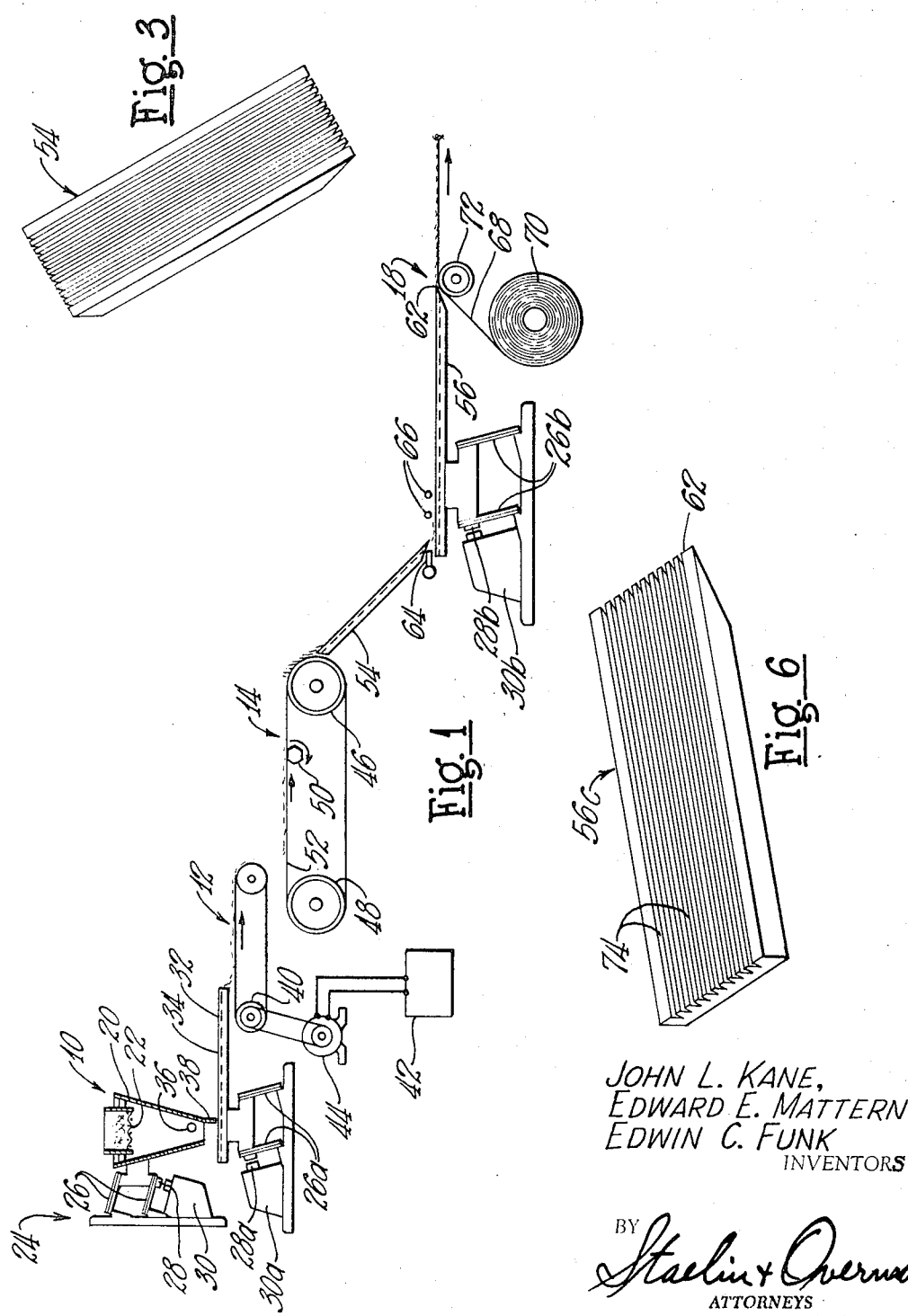
JOHN L. KANE,
EDWARD E. MATTERN &
EDWIN C. FUNK
INVENTORS
BY Staelin & Overman
ATTORNEYS

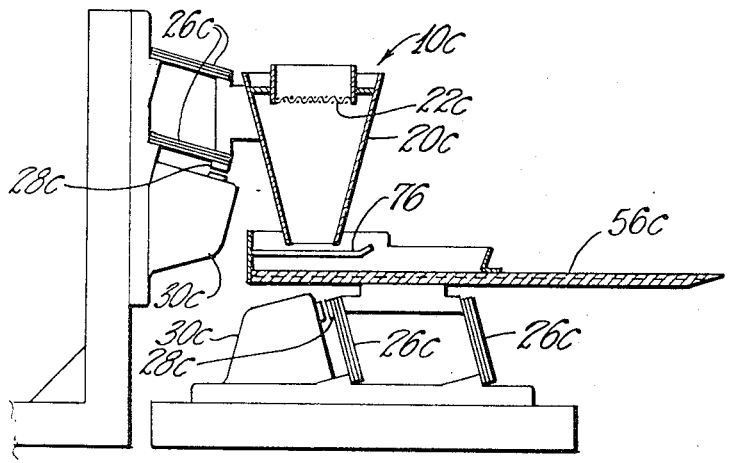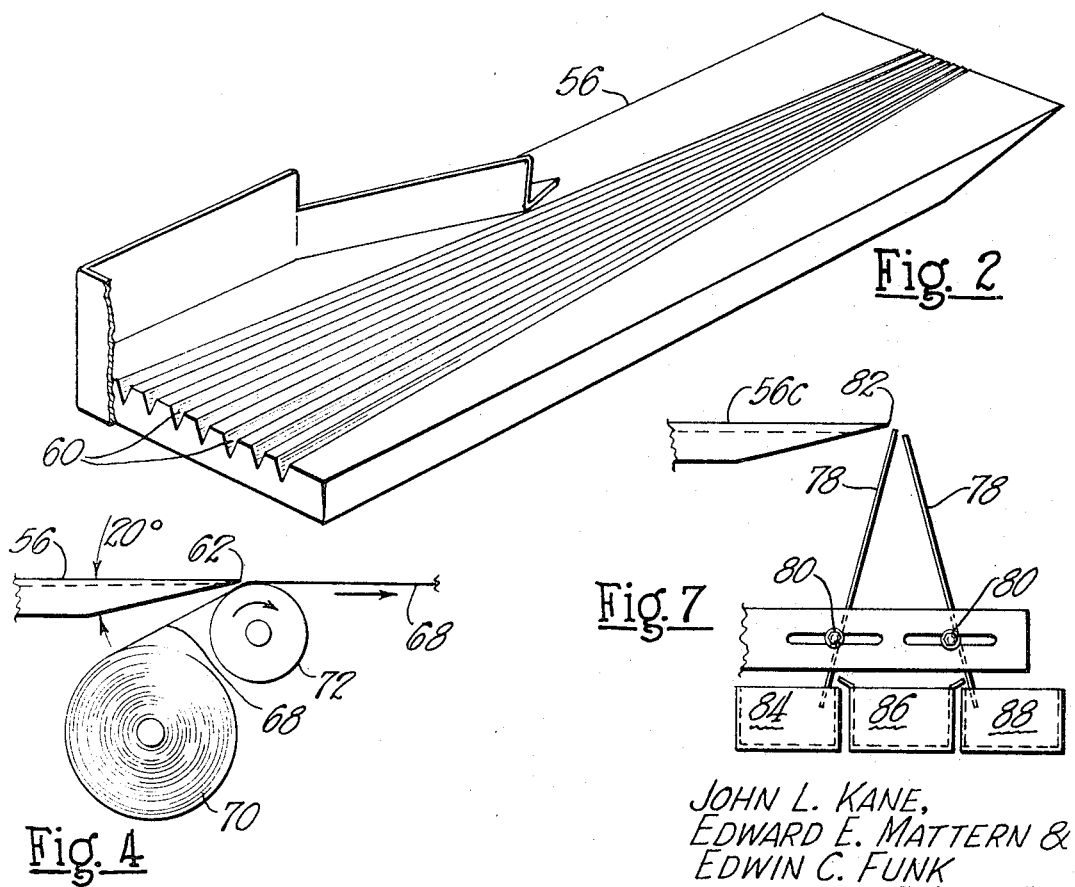

United States Patent Office 3,452,400
Patented July 1, 1969

3,452,400
FIBER ALIGNING APPARATUS
John L. Kane, Edward E. Mattern, and Edwin C. Funk, Newark, Ohio, assignors to Owens-Corning Fiberglas Corporation, a corporation of Delaware
Filed Nov. 21, 1966, Ser. No. 595,700
Int. Cl. D01g 23/00, 37/00
U.S. Cl. 19—65     13 Claims

ABSTRACT OF THE DISCLOSURE

Apparatus for aligning short relatively stiff fibers comprising a conveyor having grooves on its conveying surface which grooves extend from the feed end of the conveyor to the discharge end and decrease in both depth and spacing as the grooves proceed towards the discharge end. The conveying surface which is provided with the grooves is preferably fed by apparatus that includes a conveyor of a type which produces vertical aligning forces upon the fibers prior to being delivered to the grooved surface. The transition from the conveyor which produces the vertical forces in one embodiment is made by a chute having grooves therein to preserve the alignment achieved by the vertical forces. The preferred embodiment also includes means for providing a uniform weight rate of fiber feed to the grooved surface. In the most preferred embodiment, the discharge end of the surface containing the grooves is beveled at approximately a 20° angle and the belt is brought beneath the beveled edge to remove the aligned fibers from the ends of the grooves. In another embodiment, vertical plates are positioned adjacent the ends of the surface containing the grooves for effecting a separation of the fibers according to length.

---

The present invention relates to apparatus for aligning fibers for various purposes; and more particularly to apparatus which will convert randomly oriented fibers into a continuous uniform layer of generally parallel fibers.

A number of materials can only be produced economically in the form of short fibers, or whiskers. Processes exist for producing carbon fibers of short length which have exceedingly high tensile strength at temperatures above the melting point of the common metals. Other processes exist for forming boron fibers of not more than approximately one half inch in lenth, and these processes are much more efficient and economical than are the processes for making monofilaments of boron. Other processes exist for producing silicon carbide whiskers of up to approximately one inch in length; and still other processes exist for forming alumina whiskers of less than approximately one inch in length. All of the above mentioned materials are ultrastrong at elevated temperatures and, therefore, have great potential for use in structural materials, provided the materials are suitably incorporated into composites.

It is known that composites of fibers and a suitable matrix material have improved strength and other properties over similar composites with unaligned fibers if the fibers are aligned. Several reasons for this exist among which are that a greater amount of the fibers can be incorporated into the composites having aligned fibers. In addition, the matrix material of composites having aligned fibers will usually be subjected to smaller tensile, and compressive stresses, and there is less stress concentration in their matrix than in the matrix of composites having randomly oriented fibers.

The art has not been able to produce composites which utilize the strength which the short fibers described above are capable of providing, particularly at elevated temperatures, because there has not been a process, or apparatus which would align the fibers uniformly and economically.

Accordingly, the principal object of the present invention is the provision of a new and improved apparatus which will efficiently and economically reorient randomly oriented fibers into a continuous and uniform layer of parallel fibers.

A further object of the invention is the provision of a new and improved apparatus of the above described type which will produce a wide layer of parallel short fibers which are in close proximity to each other, and can be caused to parallelly engage each other.

Not only can a layer of uniformly parallelly oriented short fibers be used to produce composites when held together by a suitable matrix material, but other functions can be performed on the fibers by reason of their uniform orientation.

Another object of the invention is the provision of a new and improved apparatus which will separate the fibers according to their length.

A further object of the invention is the provision of a new and improved apparatus of the above described type which will produce a uniform product of aligned fibers even though the feed of randomly oriented fibers is not uniform and even though it may contain "balls" of entwined fibers.

The invention resides in certain constructions and combinations and arrangements of parts, and further objects and advantages of the invention will become apparent to those skilled in the art to which it relates from the following description of several preferred embodiments described with reference to the accompanying drawings forming a part of this specification, and in which:

FIG. 1 is a diagrammatic elevational view of a preferred embodiment of the present invention;

FIG. 2 is an enlarged isometric view of the vibrating table used in FIG. 1;

FIG. 3 is an enlarged isometric view of the transfer plate used in FIG. 1;

FIG. 4 is a fragmentary elevational view of the delivery portion of the apparatus shown in FIG. 1;

FIG. 5 is an elevational view of another embodiment of the invention;

FIG. 6 is an isometric view of the fiber aligning table of the embodiment shown in FIG. 5; and FIG. 7 is a fragmentary elevational view of the discharge end of another embodiment of the invention similar to FIG. 5, but which classifies the fibers as to length.

It has been discovered, that randomly oriented fibers when placed upon a surface having serrations therein and caused to move lengthwise of the serrations will align themselves lengthwise of the serrations with rapidity and uniformity. The fibers can be caused to move lengthwise of the serrations in any suitable manner, but in the preferred embodiment are caused to move lengthwise of the serrations by means of vibration. It has been found that the vibration helps to cause the fibers to move into the serrations and thereafter gradually rotate to a position parallel to the serrations. The invention, however, is not so limited.

The apparatus shown in FIG. 1 generally comprises means generally indicated at 10 for removing entwined masses of fibers from loose unoriented fibers. The loose unoriented fibers are thereafter fed in a continuous manner to a weigh conveyor 12 that is automatically controlled to deliver a uniform weight rate of fibers to a prealigning device 14. The device 14 can be of any suitable type, as for example electrostatic or mechanical, but in the preferred embodiment is a mechanical vibrator which causes the fibers to stand on end. The mechanical vibrator has the advantage in that it uniformly distributes the fibers and thereby further increases the uniformity of the flow of fibers through the apparatus. Thereafter, the fibers are delivered to at least one grooved or serrated surface which assures parallel alignment of the fibers following which they are delivered to removal apparatus 18 which may keep the fibers in parallel alignment, or performs some other function upon the fibers.

The means 10 shown in the drawings comprises a vibrating hopper 20 having a course screen 22 thereon through which the individual fibers fall. The screen 22 will preferably be formed by a plurality of parallel bars or wires held together by transverse members spaced apart by a distance greater than the lengths of the fibers. The individual fibers fall down between the bars or wires while entwined masses of fibers are supported on the screen. The vibration of the hopper is transferred to the screen 22 to help disrupt the entwined masses, and periodically it may be necessary for an operator to mechanically remove entwined masses which are not distintegrated by the vibration. The vibrating mechanism 24 of the hopper may be of any suitable type and is shown as being formed by two flat plate springs 26 which support the hopper. An iron core armature is fastened to the free end of one of the springs 26, and an electromagnet 30 energized by an alternating current winding causes the armature 28 to vibrate toward and away from the electromagnet 30 to vibrate the hopper 20.

The hopper 20 discharges onto a feed conveyor 32 that is driven at a constant rate of speed. The conveyor 32, shown, is a vibratory conveyor and comprises a table 34 positioned beneath the hopper 20, and which is actuated by a mechanism similar to that which vibrates the hopper. Those portions of the vibrating mechanism of the feed conveyor 32 which are similar to corresponding portions of the vibrating mechanism of the hopper are designated by a like reference numeral characterized further in that a suffix "a" is affixed thereto. The bottom of the hopper 20 is positioned but a slight distance above the table 32 so that the fibers accumulate in the lower end of the hopper 20. A photoelectric cell 36 is impinged upon by a light beam, not shown, passing through the hopper, and when the supply of fibers in the bottom of the hopper intercepts the beam of light, the photoelectric cell 36 de-energizes the electromagnet 30. A doctor blade 38 is supported from the hopper 20 so that its lower edge is spaced a predetermined distance from the feed conveyor 32 to assure a uniform depth of fibers on the feed conveyor. The feed conveyor 32 is operated at a uniform speed to give a substantially constant volume rate of discharge.

Fibers from the feed conveyor 32 fall upon the weight conveyor 12. The weight conveyor 12 comprises an endless belt pivotally supported at the feed and pulley 40. The weight of the material on the conveyor, therefore, produces a moment which is sensed by a weighing device which in turn operates an electrical control 42 which in turn controls the drive motor 44 of the conveyor. The control is such that an increase of weight on the conveyor reduces the linear speed of the conveyor, to thereby produce a substantially constant weight rate of discharge of the fibers therefrom.

The uniform flow of fibers from the weighing conveyor are delivered to the prealigning device 14. In the preferred embodiment, the device 14 is a mechanical vibrator formed by an endless flexible belt, which passes around head and tail pulleys 46 and 48 respectively, and an irregularly shaped bar, preferably a hex bar, 50 is positioned beneath the upper flight 52 of the conveyor. The hex bar 50 is rotated at a rapid rate to mechanically vibrate the top flight 52 of the conveyor. In one embodiment, the endless belt is commercially available fiber reinforced rubber belting, and the hex bar is rotated at from 100 to 300 r.p.m. The mechanical vibrating device causes the fibers to be bounced into the air, and to arrange themselves on end. Movement of the conveyor belt moves the fibers to the discharge end of the device. As previously indicated, the action of the vibrating device 14 not only up-ends the fibers, but causes them to be generally uniformly spaced to smooth out any variations in spacing and provide a uniform weight rate of discharge.

The up-ended fibers positioned above the pulley 46 fall over upon a grooved plate 54, which in the embodiment shown, transfers the fibers to a second grooved plate 56 that is part of a vibratory conveyor. In the embodiment shown, the first grooved plate 54 is inclined at a relatively steep angle, and the fibers accelerate as they slide down the grooved plate 54. The grooves of the plate 54 are of uniform depth and spacing, and the fibers discharged from the grooved plate 54 are prealigned, and in some instances are sufficiently aligned as to obviate the necessity of further alignment. In some instances it may be desirable to cause the grooved plate 54 to be a weighing device arranged to operate an electrical circuit which in turn controls the speed of the conveyor belt 52. By causing the feed of the conveyor belt 52 to be reduced upon an increase in weight on the plate 54, a uniform feed can be had to the apparatus about to be described.

In the embodiment shown in FIG. 1, however, the fibers discharged from the grooved plate 54 pass to the feed zone of a second grooved plate 56 which produces the final alignment. The grooved plate 56 is part of a vibratory conveyor which is supported and driven in the same manner as is the hopper 20, of the feed conveyor 32. Those portions of the device which correspond to similar portions of the previously described device are designated by a like reference numeral characterized further in that a suffix "b" is affixed thereto.

The serrations 60 of the plate 56 decrease in depth and spacing as they approach the discharge end or zone 62 of the grooved plate 56 (see FIG. 2). Fibers placed upon the feed end of the table 54, therefore, are first fully oriented in relatively deep grooves, and then converge into closer side by side relationship from which they can roll laterally into touching engagement when discharged onto a flat surface. To aid in the alignment of the fibers, a plurality of small air jets 64 are positioned adjacent to the feed end of the plate 56 to produce jets of air lengthwise of the serrations 60. There preferably is one air jet 64 for each serration. In some instances, it may also be desirable to provide transverse air jets 66 which discharge over the top of the serrations, to either remove, or turn the fibers resting on top of the serrations until they fall into the serrations.

The discharge end 62 of the plate is beveled to an angle of approximately 20 degrees in order that removal means can receive the fibers from the discharge end 62 without a change in their orientation during transfer. In the embodiment shown in FIG. 1, the grooved plate 56 discharges a layer of aligned fibers having appreciable width, which can be of any width desired. The removal means 18, shown, comprises a tape or ribbon which is uncoiled from a roll 70 and which passes over a small idler roll 72 that is positioned directly beneath the beveled edge of the discharge end 62. The ribbon 68 is then pulled horizontally by apparatus not shown. The distance between the ribbon 68, as it passes over the roller 72, and the discharge end 62 is less than the length of the shortest fibers handled by the apparatus, so that one end of the fibers are picked up by the ribbon 68 before the other end moves free of the grooved plate 56. Substantially no change in alignment occurs during the transition from the grooved plate 56 to the ribbon 68. The ribbon 68 then carries the layer of aligned fibers to subsequent operations where the fibers are either laminated with the ribbon, or transferred to other apparatus. The arrangement of the discharge end of the grooved plate 56 is shown enlarged in FIG. 4. In some instances, it will be desirable to apply a binder material to the ribbon before the fibers are placed thereon. This binder material will preferably be one in which the fibers will later be impregnated. It can be a silica sol, such as a water glass, or a suitable resin such as an epoxy resin or a polyester resin. The binder material is thereafter preferably cured to hold the fibers together in the form of a ribbon which can be stripped from the ribbon conveyor 68. Where the binder is a silica sol, the conveyor ribbon 68 may pass through a drying oven, not shown, and where the binder material is a resin, the oven can be operated as a curing oven. In either instance, the cured binder when stripped from the conveyor ribbon will hold the fibers in an aligned arrangement easily handled during subsequent operations.

Another embodiment of apparatus is shown in FIG. 5. The apparatus shown in FIG. 5 is generally similar to the means 10 of FIG. 1, and differs principally therefrom in that the feed conveyor 32 that is positioned beneath the means 10, contains grooves therein for aligning the fibers. Those portions of the embodiments shown in FIGS. 5 and 6 which are similar to portions of FIG. 1 are designated by a like reference numeral characterized further in a suffix "c" is affixed thereto. The table 56c differs from the table 56 in that it contains grooves 74 of constant depth and spacing. The embodiment of FIG. 5 further includes a plurality of parallel bars 76 supported by the table 56c. The bars 76 produce a prealignment of the fibers as they fall from the hopper 20c to the table 56c.

The embodiment shown fragmentarily in FIG. 7 is similar to that shown in FIGS. 5 and 6, differs only in that an arrangement is provided at the discharge end of the plate 56c to produce a separation of the fibers according to length. The apparatus shown in FIG. 7 comprises at least one, and preferably a plurality of plates 78 depending upon the number of different lengths into which the fibers are to be separated. The plates 78 are generally vertically and adjustably supported by bolts 80 so that their upper end is a predetermined distance from the discharge end of the plate 56c. By causing the distance between a plate 78 and the end of the grooved plate 56c to be slightly greater than one half of the length of the fiber desired to be separated, a classification is produced. Fibers moving off of the discharge end 82, rotate about their midpoint. If the fibers are shorter than approximately twice the distance between the first plate 78 and the discharge end 82, they rotate and slide down the first plate 78 into the first container 84. If the fibers are slightly longer than twice the distance to the first plate, they slide over the top of the first plate and fall into the second container 86. By spacing the second plate 78 a proper distance away from the first plate, fibers sliding over the edge of the first plate, will clear a second plate 78. Still longer fibers, however, will rotate over the edge of the second plate 78 and fall into the third container 88.

It will be apparent that the objects heretofore enumerated, as well as others, have been accomplished and that there has been provided a new and improved apparatus for producing a uniform discharge of aligned fibers from a randomly oriented feed.

While the invention has been described in considerable detail, we do not wish to be limited to the particular embodiments shown and described. It is our intention to cover hereby all novel adaptations, modifications, and arrangements thereof which come within the practice of those skilled in the art to which the invention relates.

We claim:

1. In apparatus for aligning short fibers: means having an upper surface over which the fibers pass from a feed area to a discharge area, said upper surface having generally V-shaped grooves therein running from said feed area to said discharge area, said V-shaped grooves decreasing in depth and spacing as they proceed from said feed area towards said discharge area, and feed means for producing generally uniform feed of the short fibers to said feed area.

2. The apparatus of claim 1 in which said means whose upper surface is provided with said V-shaped grooves is a vibratory conveyor.

3. The apparatus of claim 2 in which said vibratory conveyor includes a plate of appreciable thickness whose upper surface is provided with said V-shaped grooves and in which said discharge area is formed by one edge of the plate, said discharge edge being tapered at an angle of approximately 20°.

4. The apparatus of claim 3 including a ribbon conveyor generally paralleling the lower surface of said tapered edge for receiving the discharge of said vibratory conveyor.

5. The apparatus of claim including means for receiving aligned fibers discharged from said discharge area and comprising at least one generally vertically extending plate, the upper edge of which generally parallels said discharge edge and is spaced a distance from said discharge edge greater than the length of some fibers to be discharged from said discharge area and less than the length of other fibers to be discharged from said discharge area.

6. The apparatus of claim 2 including at least one air jet adjacent said feed area of said vibratory conveyor and which discharges longitudinally of said V-shaped grooves.

7. The apparatus of claim 1 in which said feed means includes apparatus which produces up-ending forces on the fibers.

8. The apparatus of claim 1 in which said feed means includes a belt conveyor having a fiber supporting belt portion, and means for vibrating said belt portion.

9. The apparatus of claim 8 in which said means for vibrating said fiber supporting belt portion comprises a rotatable polygonal shaped bar positioned against the under surface of said belt portion, and means for rotating said polygonal shaped bar at a speed between approximately 100 and approximately 300 r.p.m.

10. The apparatus of claim 1 wherein said feed means includes an inclined plate down which the fibers slide and having a bottom edge spaced from said upper surface of said first mentioned means by a distance less than the length of the fibers to be aligned, and at least one air jet positioned on the side of said inclined plate opposite said discharge area for directing an air flow beneath said inclined plate in a direction generally parallel to said V-shaped grooves.

11. The apparatus of claim 10 in which said inclined plate has V-shaped grooves down which the fibers slide.

12. The apparatus of claim 1 wherein said feed means comprises a conveyor, said apparatus further including means for increasing and decreasing material transporting movement of said conveyor to provide a generally constant fiber feed to said V-shaped grooves.

13. The apparatus of claim 10 including: a belt conveyor arranged to discharge from an end pulley onto said inclined plate, and a rotatably polygonal shaped bar positioned against the bottom of the belt of said belt conveyor to vibrate the fibers thereon vertically before discharge to said inclined plate.

References Cited

UNITED STATES PATENTS

| | | |
|---|---|---|
| 707,136 | 8/1902 | Mayo. |
| 1,735,471 | 11/1929 | Obici. |
| 2,719,336 | 10/1955 | Stotler _____ 19—155 XR |
| 2,914,809 | 12/1959 | Buzick _____ 19—66 |

DORSEY NEWTON, Primary Examiner.

U.S. Cl. X.R.

198—220